United States Patent
Watanabe et al.

(10) Patent No.: US 6,451,482 B1
(45) Date of Patent: *Sep. 17, 2002

(54) NON-AQUEOUS ELECTROLYTE SECONDARY BATTERIES

(75) Inventors: Shoichiro Watanabe, Nara (JP); Noriko Tanaka, Osaka (JP); Toshitada Sato, Osaka (JP); Takuyuki Shirane, Osaka (JP); Shigeo Kobayashi, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/544,017

(22) Filed: Apr. 6, 2000

Related U.S. Application Data

(63) Continuation-in-part of application No. 09/066,806, filed on Apr. 24, 1998, now Pat. No. 6,071,648.

(30) Foreign Application Priority Data

Apr. 24, 1997 (JP) .............................................. 9-106997

(51) Int. Cl.$^7$ ................................................ H01M 6/14
(52) U.S. Cl. .................................. 429/231.1; 429/231.8
(58) Field of Search ........................ 429/231.8, 231.95, 429/60, 218.1, 231.1, 231.4

(56) References Cited

U.S. PATENT DOCUMENTS 5,576,121 A     11/1996   Yamada et al.
6,071,648 A  * 6/2000   Watanabe et al.

FOREIGN PATENT DOCUMENTS

| EP | 0874410 A2 | * 10/1998 |
| JP | 7-192723 | 7/1995 |
| JP | 8-213053 | 8/1996 |

OTHER PUBLICATIONS

Caurant et al. (Synthesis by a soft chemistry route and characterization of $LiNi_xCo_{1-x}O_2(0<x>1)$ cathode materials, Solid State Ionics (91), pp. 45–54, Oct. 1, 1996.).*

* cited by examiner

*Primary Examiner*—Patrick Ryan
*Assistant Examiner*—Susy Tsang-Foster
(74) *Attorney, Agent, or Firm*—RatnerPrestia

(57) ABSTRACT

A non-aqueous secondary battery comprising a positive electrode comprising a lithium-containing metal oxide, and a negative electrode comprising a carbon material as the active material is disclosed. The electrodes are separated by either a separator impregnated with organic electrolyte solution or by a solid electrolyte layer. The negative electrode comprises a mixture of the carbon material and at least one metal oxide selected from $TiO_2$, $Cr_2O_3$, $MnO_2$, $Fe_3O_4$, $CoO$, $Co_2O_3$, $Co_3O_4$, $NiO$, $Ni_2O_3$, $Ag_2O$, $PbO$, $Sb_2O_3$, $Bi_2O_3$, $SeO_2$, and $TeO_2$.

12 Claims, 2 Drawing Sheets

NON-AQUEOUS ELECTROLYTE SECONDARY BATTERIES

CROSS-REFERENCE TO RELATED APPLICATIONS

This application is a continuation-in-part of application Ser. No. 09/066,806, filed Apr. 24, 1998, now U.S. Pat. No. 6,071,648, incorporated herein by reference.

FIELD OF THE INVENTION

This invention relates to a non-aqueous electrolyte secondary battery employing an organic electrolyte, a polymer solid electrolyte or the like. In particular, it relates to a novel constitution of positive and negative electrodes having a higher capacity without sacrificing the charge-discharge cycle life.

BACKGROUND OF THE INVENTION

A variety of secondary batteries including small-sized sealed lead-acid and nickel-cadmium systems have been developed as power sources for driving portable electronic equipment. To minimize the overall size and weight of such a driving secondary battery, newly introduced and marketed are nickel-metal hydride systems, lithium-ion systems, and other advanced secondary batteries, which are higher in the energy density. As their products are welcome widely in the market, lithium-ion batteries above all are focused which are substantially equal in the capacity density per unit volume (Wh/L) to nickel-metal hydride systems but almost two times higher in the capacity density per unit weight (Wh/kg) than the same. The lithium-ion second battery is now known as one of the lightest power sources and demanded for more improvement.

The lithium-ion secondary battery includes a negative active material of lithium and is thus regarded as a lithium secondary battery. Also, it uses a non-aqueous electrolyte such as organic electrolyte or polymer solid electrolyte and is regarded as a non-aqueous electrolyte secondary battery.

Essentially, the lithium-ion secondary battery comprises a positive electrode made of lithium contained cobalt oxide, $LiCoO_2$, or a double oxide of lithium and cobalt, and a negative electrode made of a carbon material such as graphite or coke. The electrodes are separated by a separator, assembled to form an electrode group, and placed in an organic electrolyte. In use, when the secondary battery is initially charged, lithium ions are desorbed from the positive electrode of $LiCoO_2$ and dissolved into the electrolyte. Simultaneously, lithium ions in the electrolyte are absorbed in the carbon material of the negative electrode to form $C_6Li$. During the initial discharge, lithium ions in the electrolyte are absorbed in the positive electrode and restored to a $LiCoO_2$ form. At the time, lithium ions are desorbed from the negative electrode of $C_6Li$ and dissolved into the electrolyte. Because the charge and the discharge reaction on the positive and negative electrodes are reversible, the battery system is called a rocking-chair battery. The rocking-chair battery may have a longer cycling life of over 1000 cycles provided that neither overcharge or over-discharge occurs.

It is, however, said that the reversible reaction on the positive and the negative electrodes in the charge and discharge are not uniform. As described above, the initial charge permits lithium ions to be desorbed from $LiCoO_2$ of the positive electrode, but not the whole amount of lithium ions is absorbed in the positive electrode and restored to $LiCoO_2$ in the initial discharge. In other words, it is common that a smaller amount of lithium ions than the amount desorbed in the initial charge is successfully absorbed in the positive electrode. Also, in the initial charge, an amount of lithium ions equivalent to the charge capacity of the positive electrode is absorbed in the negative electrode made of a carbon material to form to $C_6Li$. The negative electrode however desorbs about 80% or more of the whole amount of absorbed lithium ions in the initial discharge. As the remaining 20% of lithium has been trapped in the negative electrode, it will not participate in the charge and discharge reactions of a succeeding cycle. Such an amount of lithium ions trapped in the negative electrode and isolated from the charge and discharge reactions is regarded as "dead lithium" and should be discriminated from the other active portion. Although the efficiency of reaction during the charge and discharge after the initial discharge is affected by the rates of charge and discharge and the ambient temperature at the site and may not reach 100%, its declination will is not compared to a difference between the initial charge capacity and the initial discharge capacity. It is hence essential to design constitution of the lithium-ion secondary battery to account a ratio of the initial discharge capacity to the initial charge capacity (referred to as an initial charge and discharge efficiency hereinafter) on the positive and negative electrodes in order to determine the theoretical capacity values of the positive and negative electrodes.

The capacity of the secondary battery will be increased when a material having a higher charge-discharge efficiency or, more specifically a higher initial charge-discharge efficiency, is used as the positive and negative electrodes. An example using $LiCoO_2$ as the positive electrode is disclosed in Japanese Patent Laid-open Application No. Sho63-59507. $LiCoO_2$ has a higher initial charge-discharge efficiency and also a higher electrode potential (thus producing a higher voltage output of the battery), hence being suited as a material for the positive electrode. Cobalt is however an expensive material that is produced in only a few regions of the earth (for example, Zambia in Africa). Hence, its supply and price largely depend on the political situation in the regions. It is thus proposed to substitute such a critical material as $LiCoO_2$ with lithium contained in nickel oxide, $LiNiO_2$, which is favorable in both the price and availability, which may provide a higher capacity than that of $LiCoO_2$, as disclosed in Goodenough, U.S. Pat. No. 4,302,518.

The electrode potential of $LiNiO_2$ is about 0.2 volt lower than that of $LiCoO_2$ and may thus promote the desorbing of lithium ions before the non-aqueous electrolyte such as organic electrolyte reaches its decomposition voltage in the charge. This results in increase of the charge capacity and thus improvement of the discharge capacity. However, the initial charge-discharge efficiency of $LiNiO_2$ is not high enough and causes declination of the capacity as the charge and discharge cycle is repeated again and again, whereby its practical use will be difficult.

To eliminate the drawback of $LiNiO_2$, double oxide such as $Li_xNi_xCo_{1-x}O_2$ or $Li_xM_yN_zO_2$, including lithium and plural metals (where M is at least an element selected from a group of Fe, Co, and Ni, and N is at least an element selected from a group of Ti, V, Cr, and Mn) is provided as disclosed in Japanese Patent Laid-open Application Sho63-299056 or Publication Sho63-267053.

A. Rougiel et al, *Solid State Ionics*, 90, 83–90 (1996) have reported that $Li_xNi_xCo_{1-x}O_2$ phases crystallize in the rhombohedral system with a layered structure. For small amounts of cobalt, i.e., (1–x) is less than 0.2, extra-divalent nickel ions are always present. However, cobalt substitution decreases the non-stoichiometric character of lithium nickelate. For compositions in which (1−x) is greater than 0.3, a pure 2D structure is observed.

To increase the capacity of the lithium-ion secondary battery, it is essential to use proper materials for the positive and negative electrodes to provide a high initial charge and discharge efficiency and as high a reversible capacity in the charge and discharge reactions as possible. It is also desired to minimize the amount of "dead lithium" and the irreversible capacity on the positive and negative electrodes so that the negative electrode is prevented from being overcharged and free from deposition of metallic lithium. If the positive electrode is higher in the initial charge and discharge efficiency than the negative electrode, it will extremely be difficult to design and fabricate an improved secondary battery that satisfies the above requirements.

The addition of metal oxide, such as FeO, $FeO_2$, $Fe_2O_3$, SnO, $SnO_2$, $MoO_2$, $V_2O_5$, $Bi_2Sn_3O_9$, $WO_2$, $WO_3$, $Nb_2O_5$, or $MoO_3$, to a carbon material for the negative electrode is depicted in Japanese Patent Laid-open Publication Hei7-192727. However, the metal oxide is selected from compounds that can absorb and desorb lithium in reverse relationship during the charge and discharge. Also, the metal oxide is intended for preventing the negative electrode potential to sharply rise in the end of the discharge and dissolve the copper foil as a core material of the electrode, hence decreasing the cycle life. The purpose and the effect of addition of the metal oxide are not equal to those of the invention where metal oxide is carefully selected and used for promoting electrochemical reduction in the initial charge to generate a quantity of metal in irreversible reaction.

SUMMARY OF THE INVENTION

The invention is a non-aqueous electrolyte secondary battery. The battery comprises a positive electrode and a negative electrode separated by either a separator impregnated with organic electrolyte solution or by a solid electrolyte layer. The positive electrode comprises mainly lithium containing metal oxide, and the negative electrode comprises mainly a mixture of a carbon material, as the active material, and the metal oxide can electrochemically be reduced to metal by charge. This allows the negative electrode to eliminate "dead lithium," which hardly contributes to the charge and discharge reactions and to be prevented from being overcharged. Accordingly, the non-aqueous electrolyte secondary battery of the invention will increase its cycle life and capacity.

The advantage of the invention is enhanced with the positive electrode made of a lithium containing metal oxide that comprises mainly a lithium containing nickel oxide having 75 to 95% of initial charge and discharge efficiency.

DETAILED DESCRIPTION OF THE INVENTION

Preferred embodiments of the invention will be described in more detail referring to the accompanying drawings and tables. These preferred embodiments illustrate the invention but do not limit the invention in any manner. In particular, the invention is not limited by the method of preparation of any specific component thereof.

Figure 1:
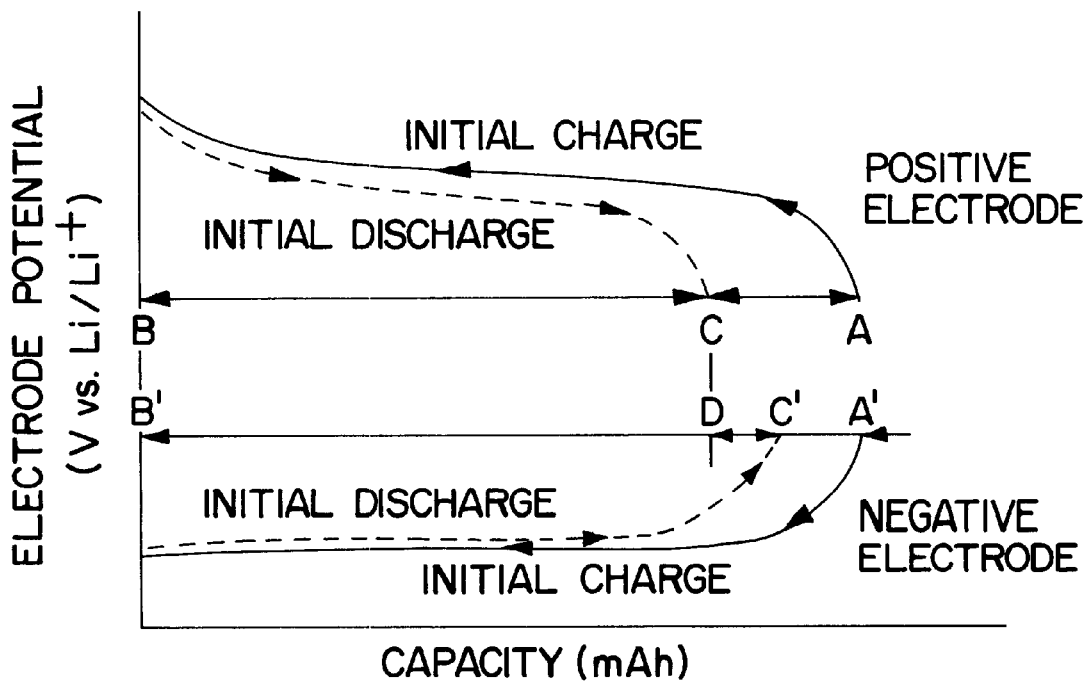
FIG. 1 is a schematic illustration showing the potential behavior of the positive and negative electrodes of a conventional non-aqueous electrolyte secondary battery in the initial charge and initial discharge when both electrodes are set equal in the theoretical capacity.

Referring to the Figures, FIG. 1 schematically illustrates the potential behavior of the positive and negative electrodes in the initial charge and initial discharge of a secondary battery of which negative electrode is made of a graphite system material identical in the theoretical capacity to the positive electrode material.

In FIG. 1, (A-B) is an initial charge capacity at the positive electrode, (B-C) is an initial discharge capacity of the positive electrode, and (C-A) is a non-reversible capacity of the positive electrode.

Also, (A'-B') is an initial charge capacity at the negative electrode which is equivalent to the (A-B) at the positive electrode. (B'-C') is an initial discharge capable capacity of the negative electrode, and (C'-A') is a non-reversible capacity of the negative electrode. Because the initial discharge capable capacity of the negative electrode (B'-C') is greater by (C'-D) than the initial discharge capacity of the positive electrode (B-C), the initial discharge capacity of the battery is limited by the initial discharge capacity of the positive electrode (B-C). In charge and discharge cycle after the initial discharge, the reversible reactions are proceeded between (B-C) at the positive electrode and between (B'-D) (equivalent between B-C) at the negative electrode. Accordingly, an amount of lithium of considerable capacity (C'-D) at the negative electrode traps as "dead lithium" in the negative electrode and will hardly act on the charge and discharge reactions thus not contributing to the increase of the battery capacity.

When the theoretical capacity of the both electrodes is adjusted by increasing of filling amount of the positive electrode so that the initial discharge capacity is equal between the positive electrode and the negative electrode, the negative electrode will be overcharged by (C'-D) determined by the amount of "dead lithium" at the negative electrode, which is equal to a difference between the non-reversible capacity (C-A) of the positive electrode and the non-reversible capacity (C'-A') of the negative electrode. As the result, a metallic lithium is deposited on the surface of the negative electrode, thus negative electrode is passivated by the reaction between deposited metal lithium and organic electrode solution and decreases the cycle life of the battery.

Accordingly, the adjustment of the theoretical capacity on both the positive and negative electrodes may be unsuitable.

EMBODIMENT 1

Figure 3:
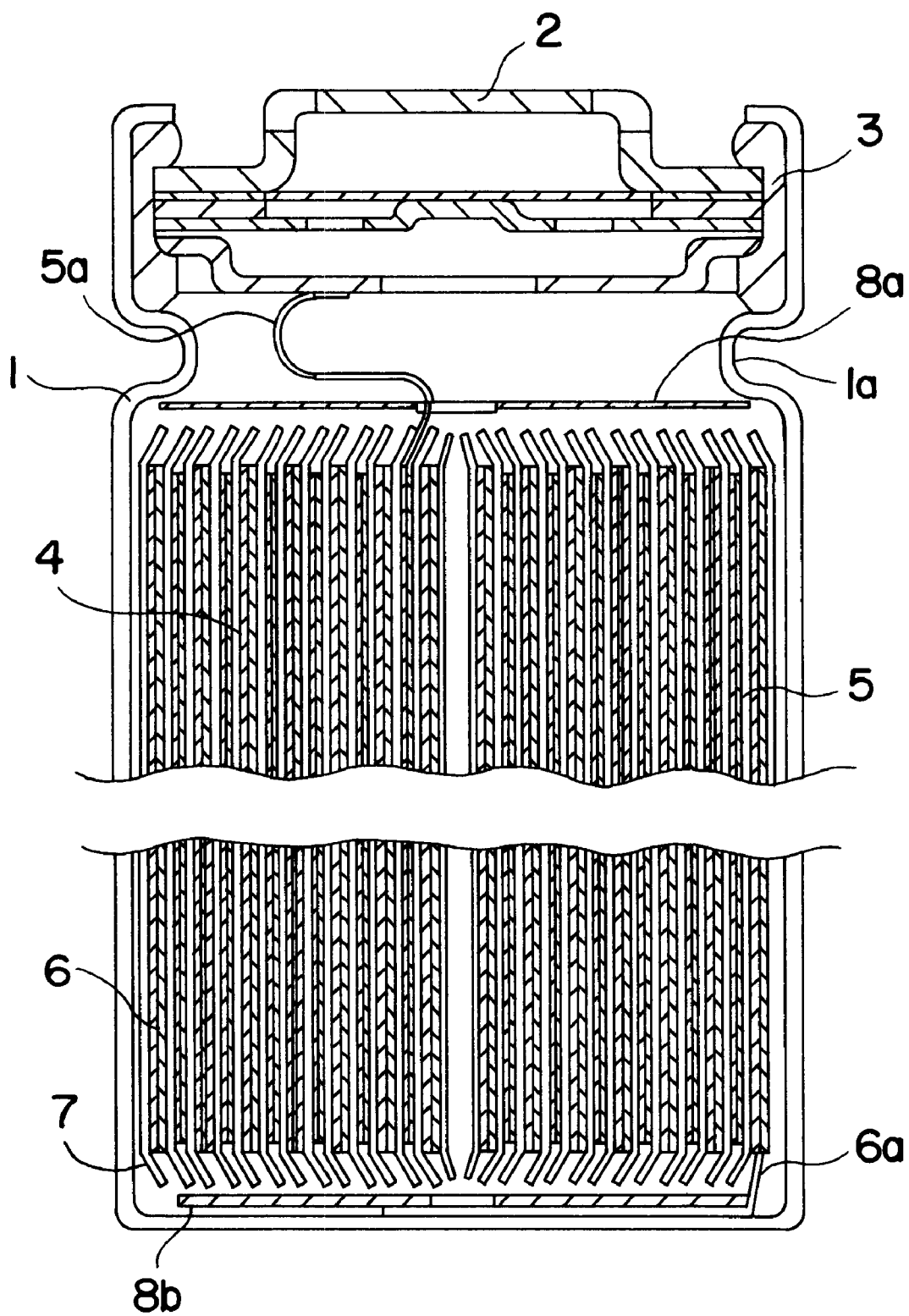
FIG. 3 is a longitudinal cross sectional view of a typical cylindrical non-aqueous electrolyte secondary battery.

FIG. 3 illustrates a longitudinal cross sectional view of a typical cylindrical non-aqueous electrolyte secondary battery employed in this embodiment. As shown in FIG. 3, an electrode group 4, which comprises a sheet of positive electrode plate 5 and a sheet of negative electrode plate 6 separated from each other by a separator 7 made of a polyolefin microporous membrane and assembled in a roll form, is installed in a stainless steel cell case 1 together with an upper insulating plate 8a and a lower insulating plate 8b mounted on the top and bottom thereof. The positive electrode plate 5 and the negative electrode plate 6 are provided with an aluminum foil positive electrode lead tab 5a and a copper foil negative electrode lead tab 6a respectively. The positive electrode lead tab 5a and the negative electrode lead tab 6a are joined by welding for electrical connection to the lower side of an assembled cell cover 2 of an explosion-proof structure and the inner side of the cell case 1 respectively.

Annular groove 1a is provided in an upper end region of the cell case 1 so that its wall extends inwardly and the cell case 1 is then poured with an appropriate quantity of organic electrolyte solution to impregnate into the electrode group 4. The assembled cell cover 2 equipped with a gasket 3 is fitted until its lower end engages with the groove 1a. When the upper end of the cell case 1 has been curled inwardly for sealing liquid-tightly and gas-tightly, the secondary battery is completed.

Lithium containing metal oxide used as a material of the positive electrode is prepared by the following manner. A mixture solution of nickel sulfate ($NiSO_4$) and cobalt sulfate ($CoSO_4$) is stirred and added with an excessive amount of aqueous sodium hydroxide (NaOH) to allow coprecipitation of nickel hydroxide ($Ni(OH)_2$) and cobalt hydroxide ($Co(OH)_2$). The coprecipitated sediment is rinsed by decantation, filtered, and dried. The sediment has a composition of $Ni_{0.85}Co_{0.15}(OH)_2$.

The sediment is then mixed with a specific amount of lithium hydroxide crystal ($LiOH(H_2O)$). The mixture is baked for 10 hours at 800° C. under the oxidation atmosphere such as in the air, thus yielding a lithium-containing metal oxide. It is proved by chemical analysis that the composition of the lithium-containing metal oxide is $LiNi0.85Co_{0.15}O_2$, which is a mother material for the positive electrode.

One hundred (100) parts by weight of $LiNi_{0.85}Co_{0.15}O_2$ powder, 3 parts by weight of acetylene black, and 5 parts by weight of polyvinylidene fluoride (PVDF) resin binder are mixed together and added with N-methyl-pyrrolidone to prepare a positive electrode paste. The paste is applied to both sides of an aluminum foil of 0.020 mm thick, using a coater, dried, and roll pressed to a thickness of 0.130 mm. After trimmed to a size of 35 mm wide and 270 mm long, the positive electrode plate is completed. As described previously, the positive electrode plate is then provided with a positive electrode lead tab of the aluminum foil.

The negative electrode plate is prepared as follows. Graphite powder is used as a primary carbon material for the negative electrode. Metal oxide is added and mixed with the carbon material for the negative electrode in a ratio of 0.2 to 20% by weight to the sum of the carbon material and the metal oxide. Graphite powder (100 parts by weight) is mixed with each of fifteen different types of metal oxide including $Ag_2O$, PbO, NiO, $Ni_2O_3$, CoO, $Co_2O_3$, $Co_3O_4$, $TiO_2$, $Bi_2O_3$, $Sb_2O_3$, $Cr_2O_3$, $SeO_2$, $TeO_2$, $MnO_2$, and $Fe_3O_4$ so that each corresponding mixture contains 9.06, 8.75, 3.10, 6.65, 3.11, 6.65, 10.31, 6.41, 16.67, 11.11, 6.12, 4.55, 6.41, 6.95, or 9.02% by weight of the metal oxide, respectively. The mixture is further mixed with styrene-butadiene copolymer system binder and carboxymethyl cellulose aqueous solution to prepare a negative electrode paste.

The amounts of the 15 different types of metal oxide added to the carbon material are predetermined so that a sum of the electrical capacity (mAh) generated by electrochemical reduction of each metal oxide to a metal and the non-reversible capacity (mAh) of the carbon material of the negative electrode is equal to the non-reversible capacity of the lithium containing metal oxide of the positive electrode.

The negative electrode paste is applied to both sides of a copper foil of 0.015 mm thick, using a coater, dried, and roll pressed to a thickness of 0.20 mm. After trimmed to a size of 37 mm wide and 300 mm long, the negative electrode plate is completed. Similar to the positive electrode plate, the negative electrode plate is then provided with a negative electrode lead tab of the copper foil.

The organic electrolyte solution is prepared by dissolving lithium hexafluorophosphate ($LiPF_6$) into an equal volume mixed solvent of ethylene carbonate and ethyl-methyl carbonate to use a concentration of 1.0 mol/L.

It is assumed that the secondary batteries having the negative electrode made of the carbon material added with fifteen different types of metal oxide respectively are denoted by the numbers raging from 1 to 15, a comparison cell in which the negative electrode is made of only the carbon material is denoted by 16.

A series of experimental charge and discharge were carried out using a constant current of 100 mA, an end-of-charge voltage of 4.2 V/cell, and an end-of-discharge voltage of 2.5 V/cell. Resultant measurements of the initial charge capacity, the initial discharge capacity, the initial charge and discharge efficiency, and the cycle life are listed in Table 1 as average values in five each cells. The cycle life is expressed by the number of cycles where the discharge capacity is kept 70% of that in the third cycle.

TABLE 1

| Cell No. | Metal oxide for negative electrode | Initial charge capacity (mAh) | Initial discharge capacity (mAh) | Initial charge/ discharge efficiency (%) | Cycle life (cycles) |
|---|---|---|---|---|---|
| 1 | $Ag_2O$ | 653 | 603 | 92.3 | 689 |
| 2 | PbO | 648 | 589 | 90.9 | 647 |
| 3 | NiO | 649 | 598 | 91.8 | 702 |
| 4 | $Ni_2O_3$ | 645 | 597 | 92.6 | 704 |
| 5 | CoO | 647 | 601 | 92.9 | 609 |
| 6 | $Co_2O_3$ | 650 | 600 | 92.3 | 597 |
| 7 | $Co_3O_4$ | 647 | 598 | 92.4 | 605 |
| 8 | $TiO_2$ | 654 | 603 | 92.2 | 608 |
| 9 | $Bi_2O_3$ | 656 | 601 | 91.6 | 658 |
| 10 | $Sb_2O_3$ | 645 | 599 | 92.9 | 654 |
| 11 | $Cr_2O_3$ | 649 | 598 | 92.6 | 655 |
| 12 | $SeO_2$ | 648 | 604 | 93.2 | 693 |
| 13 | $TeO_2$ | 644 | 609 | 94.6 | 635 |
| 14 | $MnO_2$ | 647 | 602 | 93.0 | 596 |
| 15 | $Fe_3O_4$ | 658 | 607 | 92.2 | 654 |
| 16 | — | 646 | 597 | 92.4 | 150 |

As is apparent from Table 1, cells No. 1 to No. 15, in which the negative electrodes comprise carbon material to which has been added each of 15 different metal oxides, are substantially similar in the initial charge and discharge efficiency, but are highly distinguished in the cycle life from the cell No. 16, which does not comprise added metal oxide. More particularly, the cycle life of the cell No. 16 is remarkably shorter than that of cells No. 1 to No. 15.

Disassembly and review of cell No. 16 after the experimental charge and discharge cycle showed a glossy deposit of metallic lithium on the negative electrode. The deposit of metallic lithium partially created in the earlier cycle than of the other cells may be the reason of loss of the capacity due to the passivation of the negative electrode by the reaction between deposited metallic lithium and organic electrolyte solution.

In Embodiment 1, the amounts of the 15 different types of metal oxide added to the carbon material for the negative electrode are calculated from theoretical capacity determined by the following manner.

The metal oxide, for example, NiO, is mixed with about 30 wt % of acetylene black and pressed under a pressure of 250 kg/cm² to a pellet form which is then coupled integrally with a 18-8 stainless steel netting of 100 mesh to yield a working electrode. The counter electrode and reference electrode are made of metallic lithium. The three electrodes are placed in an organic electrolyte solution that is identical to that of the above-mentioned secondary battery. The charge capacity is then measured until the voltage at the reference electrode is 0 V at a constant current of less than 0.1 mA/cm². The electrochemical reduction caused by the charge is expressed by:

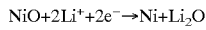

$$NiO+2Li^{+}+2e^{-} \rightarrow Ni+Li_2O$$

The generated metal, such as Ni, is stable chemically and electrochemically in the charge and discharge potential region of the carbon material of the negative electrode and is not oxidized but remains in metal phase during the discharge on the negative electrode as is irreversible. Because a quantity of metal is generated from the metal oxide in the initial charge, the negative electrode will increase its electronic conductivity and decrease its internal resistance and polarization.

Figure 2:
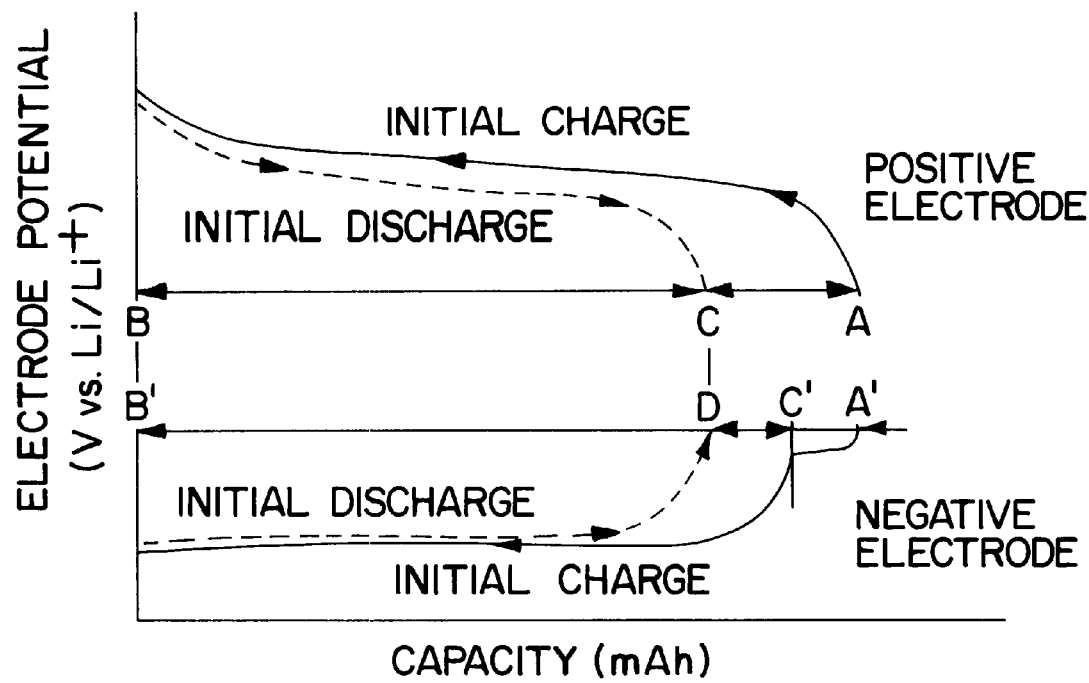
FIG. 2 is a schematic illustration showing the potential behavior of the positive and negative electrodes of a non-aqueous electrolyte secondary battery according to the invention in the initial charge and initial discharge.

FIG. 2 is a schematic illustration showing the potential behavior of the positive and negative electrodes in the initial charge and initial discharge of a non-aqueous electrolyte secondary battery of the invention. In FIG. 2, (A-B) is an initial charge capacity at the positive electrode, (B-C) is an initial discharge capacity of the positive electrode, and (C-A) is a irreversible capacity of the positive electrode.

Also, (A'-B') is an initial charge capacity at the negative electrode which is equivalent to the (A-B) at the positive electrode. At initial charge, the metal oxide added to the carbon material of the negative electrode is electrochemically reduced to charge a quantity of (A'-C') and then, lithium ions is absorbed in the carbon material of the negative electrode for charging the rest. The initial charge capacity of the carbon material is (C'-B'). The initial discharge capacity of the negative electrode is (B'-D) which is equivalent to (B-C) of the positive electrode. The initial discharge capacities of both the positive and negative electrodes are thus reversible capacities to each other. The irreversible capacity of the negative electrode is (C'-D) which is regarded as a irreversible capacity of the carbon material. As is apparent from FIG. 2, the invention permits the quantity of metal oxide added to the carbon material that is a active material of the negative electrode to correspond to a difference (A'-C') given by subtracting the irreversible capacity of the carbon material of the negative electrode from the irreversible capacity (C-A) of the positive electrode.

The metal oxide which is added to the negative electrode and in the charge, reduced electrochemically to generate a metal in irreversible reaction is higher in not only true specific weight but also bulk density than the carbon material such as graphite powder and its addition to the negative electrode will produce a negligible increase in the entire volume. Accordingly, because the negative electrode is added with a metal oxide which is electrochemically reduced in the charge or more specifically, in the initial charge to generate a quantity of metal in the irreversible reaction, the reversible capacities of both the positive and negative electrodes are utilized at optimum thus contributing to the higher capacity of the secondary battery. Also, the negative electrode is substantially prevented from being overcharged in the second and more charge after the initial cycle, hence avoiding declination of the cycle life.

EMBODIMENT 2

The coprecipitated hydroxide, $Ni_{0.85}Co_{0.15}(OH)_2$, prepared in Embodiment 1, was mixed with a specific amount of $LiOH(H_2O)$ and heated under an oxidizing atmosphere at different temperatures to examine the effect of reaction temperature. The duration of the reaction was always 10 hours, and the temperature was varied from 800 to 700, 750, 850, 900, and 950° C. NiO was selected as the metal oxide to be mixed with graphite powder for the negative electrode and its content was 3.10 wt %, equal to that in Embodiment 1.

A secondary battery was fabricated under the same conditions as of Embodiment 1 and tested for the charge and discharge cycle under the same conditions. The results for these non-limiting embodiments are shown in Table 2. The measurements of the cells No.3 and No. 16 in Table 1 are appropriated for the positive electrode at the reaction temperature of 800° C.

Although Table 2 describes cells prepared by certain methods herein described, the invention is not limited to cells prepared by these methods. As is apparent from Table 2, at a reaction temperature of 700° C., or less than 750° C., for No.17 and No.22, cell No.22, which does not contain NiO, has a cycle life as long as the cells No.17 to No.20 and No.3, except for No.21 in which a negative electrode is added with metal oxide that can electrochemically be reduced by the initial charge to release a quantity of metal. This may be explained by the fact that when the reaction temperature for the positive electrode is 700° C., the initial charge and discharge efficiency is high and the irreversible capacity of the positive electrode is small. Thus, the irreversible capacity of the positive electrode becomes nearly equal to the irreversible capacity of the negative electrode. Under these conditions, the negative electrode is prevented from being overcharged so that the cycle life is not affected. Although the positive electrode may be less efficient when the reaction temperature is 750° C. or lower, the electrode still may function as the positive electrode of the invention.

TABLE 2

| Cell No. | Positive electrode reaction temp (° C.) | Negative electrode metal oxide | Initial charge capacity (mAh) | Initial discharge capacity (mAh) | Initial charge/ discharge efficiency (%) | Cycle life (cycles) |
| --- | --- | --- | --- | --- | --- | --- |
| 17 | 700 | NiO | 712 | 650 | 91.3 | 657 |
| 18 | 750 | NiO | 702 | 660 | 94.0 | 650 |
| 3 | 800 | NiO | 649 | 596 | 91.8 | 702 |
| 19 | 850 | NiO | 623 | 570 | 91.5 | 687 |
| 20 | 900 | NiO | 587 | 520 | 88.5 | 658 |
| 21 | 950 | NiO | 413 | 220 | 53.3 | 634 |
| 22 | 700 | Non | 712 | 690 | 96.9 | 653 |
| 23 | 750 | Non | 702 | 660 | 94.0 | 304 |
| 16 | 800 | Non | 646 | 597 | 92.4 | 150 |
| 24 | 850 | Non | 623 | 572 | 91.8 | 261 |
| 25 | 900 | Non | 587 | 515 | 87.7 | 153 |
| 26 | 950 | Non | 413 | 224 | 54.2 | 120 |

When the reaction temperature is 950° C. or higher, the crystalline structure of the positive electrode separates into two phases, a hexagonal system and a rock salt structure. This decreases the initial charge and discharge efficiency to about 50% and impairs the discharge characteristics of the positive electrode. Although the positive electrode is less efficient when the reaction temperature is 950° C. or higher, the electrode still may function as the positive electrode of the invention.

Thus, although materials processed at other temperatures may be used in the invention, the positive electrode material is preferably processed at a range of the reaction temperature from 750 to 900° C. after the coprecipitated metal hydroxide is mixed with lithium hydroxide. In a preferred embodiment, the positive electrode comprises $LiNi_xM_{1-x}O_2$. M is at least a metallic element selected from the group consisting of Al, V, Cr, Mn, Fe, and Co, and $0.5 \leq x \leq 1.0$, i.e., 0.5 less than or equal to x less than or equal to 1.0 (the value of x is in the range of 0.5 to 1.0, inclusive). More preferably, the positive electrode comprises $LiNi_xM_{1-x}O_2$ in which M is at least a metallic element selected from the group consisting of Al, V, Cr, Mn, Fe, and Co, and $0.8 \leq x \leq 1.0$, i.e., 0.8 less than or equal to x less than or equal to 1.0 (the value of x is in the range of 0.8 to 1.0, inclusive). The initial charge and discharge efficiency of this material ranges from 75% to 95%. Even if the reaction temperature for the positive electrode is 750 to 900° C., the cycle life of cells No.23 to No.25, in which the negative electrode does not contain the metal oxide of the invention, is unfavorable. This may translate to the advantage of the invention.

Although the metal oxide added to the negative electrode is used as a single material in Embodiments 1 and 2, it may be mixed with another material with equal success.

The active material of the positive electrode is not limited to a particular type of lithium containing metal oxide, denoted by $LiNi_xM_{1-x}O_2$, where a part of Ni is substituted by Co, but another metal oxide where the same is substituted by at least a metal element selected from the group consisting of Mn, Cr, Fe, V, and Al may be employed as having been proved to exhibit the same effect in experiments.

Although the non-aqueous electrolyte is an organic electrolyte solution comprising mainly $LiPF_6$, ethylene carbonate and methylethyl carbonate mixed solvent solution, it may be any combination of a lithium salt, such as lithium perchlorate ($LiClO_4$), lithium tetrafluoroborate ($LiBF_4$), lithium trifluoro-methansulfonate ($LiCF_3SO_3$), or lithium hexafluoroarsenate ($LiAsF_6$) with a binary or polytopic system organic solvent including a cyclic ester such as propylene carbonate, a cyclic ether such as tetrahydrofuran, a chain ester such as dimetoxyethane, or a chain ester such as methylpropionate.

Although illustrated and described herein with reference to certain specific to embodiments, the invention is nevertheless not limited to the details shown or to the preferred embodiments disclosed herein. Rather, various modifications may be made in the details within the scope and range of equivalents of the claims and without departing from the spirit of the invention. Although preparation of certain components and materials used in the invention has been described with respect to certain preferred methods of preparation, the invention is not limited to embodiments comprising components prepared by the preferred methods. Nor is the invention is limited to embodiments comprising components prepared any particular method, such as the methods disclosed herein. Thus, as set forth above, the invention can be practiced with positive electrode material prepared at temperatures above 950° C. and at temperatures below 700° C.

It is understood that the organic electrolyte solution is not limited to the above-listed items but may be polymer solid electrolyte or gel polymer electrolyte that comprises polymer solid electrolyte mixed with organic solvent provided as a plasticizer. Although the secondary battery of the embodiment is of a cylindrical cell structure, the invention does not depend on the cell shape. Any other shape, such as a rectangular or a sheet, of the cell may be used with equal success.

What is claimed is:

1. A non-aqueous electrolyte secondary battery comprising:

a positive electrode comprising a lithium containing metal oxide;

a negative electrode comprising a carbon material as active material and a metal oxide; and either a separator impregnated with an organic electrolyte solution or a solid electrolyte layer disposed between said positive electrode and said negative electrode;

in which the negative electrode metal oxide is selected from the group consisting of $TiO_2$, $Cr_2O_3$, $MnO_2$, $Fe_3O_4$, $CoO$, $Co_2O_3$, $Co_3O_4$, $NiO$, $Ni_2O_3$, $Ag_2O$, $PbO$, $Sb_2O_3$, $Bi_2O_3$, $SeO_2$, and $TeO_2$.

2. The non-aqueous electrolyte secondary battery of claim 1 in which the lithium containing metal oxide for the positive electrode has an initial charge and discharge efficiency of 75 to 95% where lithium ions are desorbed in the initial charge and absorbed in the initial discharge.

3. The secondary battery of claim 1 in which the metal oxide is present in a specific amount equivalent to a difference of irreversible capacity between the positive electrode and the negative electrode.

4. The secondary battery of claim 1 in which the metal oxide comprises 0.2 to 20% by weight to the sum of the weights of the carbon material and the metal oxide.

5. The secondary battery of claim 2 in which the lithium containing metal oxide is $LiNi_xM_{1-x}O_2$, in which M is a metallic element selected from the group consisting of Al, V, Cr, Mn, Fe, and Co, and $0.5 \leq x \leq 1.0$.

6. The secondary battery of claim 5 in which M is Co.

7. The secondary battery of claim 3 in which the metal oxide comprises 0.2 to 20% by weight to the sum of the weights of the carbon material and the metal oxide.

8. The non-aqueous electrolyte secondary battery of claim 7 in which the lithium containing metal oxide for the positive electrode has an initial charge and discharge efficiency of 75 to 95% where lithium ions are desorbed in the initial charge and absorbed in the initial discharge.

9. The secondary battery of claim 3 in which the lithium containing metal oxide is $LiNi_xM_{1-x}O_2$, in which M is a metallic element selected from the group consisting of Al, V, Cr, Mn, Fe, and Co, and $0.5 \leq x \leq 1.0$.

10. The secondary battery of claim 8 in which M is Co.

11. The secondary battery of claim 8 in which the lithium containing metal oxide is $LiNi_xM_{1-x}O_2$, in which M is a metallic element selected from the group consisting of Al, V, Cr, Mn, Fe, and Co, and $0.5 \leq x \leq 1.0$.

12. The secondary battery of claim 11 in which M is Co.

* * * * *

UNITED STATES PATENT AND TRADEMARK OFFICE
CERTIFICATE OF CORRECTION

PATENT NO. : 6,451,482 B1
DATED : September 17, 2002
INVENTOR(S) : Watanabe et al.

It is certified that error appears in the above-identified patent and that said Letters Patent is hereby corrected as shown below:

<u>Title page,</u>
Item [56], References Cited, OTHER PUBLICATIONS, "Caurant et al. (Synthesis by a soft chemistry...LiNixCo1-x02(0<x>1)..." should read -- Caurant et al. (Synthesis by a soft chemistry...iNixCo$_{1-x}$02(0≤x≤1... --

Signed and Sealed this

Fifth Day of August, 2003

JAMES E. ROGAN
*Director of the United States Patent and Trademark Office*